(12) United States Patent
Chen

(10) Patent No.: US 7,203,061 B1
(45) Date of Patent: Apr. 10, 2007

(54) MOBILE HARD DISK MOUNTING STRUCTURE

(76) Inventor: Wilson Chen, 3F, No. 1, Alley 6, Lane 45, Pao-Hsin Rd., Hsin-Tien, Taipei (TW)

( * ) Notice: Subject to any disclaimer, the term of this patent is extended or adjusted under 35 U.S.C. 154(b) by 0 days.

(21) Appl. No.: 11/588,401

(22) Filed: Oct. 27, 2006

(51) Int. Cl.
*G05F 1/16* (2006.01)

(52) U.S. Cl. .................... 361/685; 312/223.2

(58) Field of Classification Search .............. 361/685
See application file for complete search history.

(56) References Cited

U.S. PATENT DOCUMENTS

| | | | |
|---|---|---|---|
| 5,491,608 A * | 2/1996 | Koyanagi et al. | 361/685 |
| 5,595,430 A * | 1/1997 | Weyeneth | 312/319.1 |
| 6,477,042 B1 * | 11/2002 | Allgeyer et al. | 361/685 |
| 6,478,390 B2 * | 11/2002 | Gan | 312/223.3 |
| 6,552,897 B1 * | 4/2003 | Jetter et al. | 361/685 |

* cited by examiner

*Primary Examiner*—Lisa Lea-Edmonds
*Assistant Examiner*—Anthony Q. Edwards
(74) *Attorney, Agent, or Firm*—Rosenberg, Klein & Lee

(57) ABSTRACT

A mobile hard disk mounting structure is disclosed to include two bridge-like spring strips arranged in parallel inside a mobile hard disk box, each bridge-like spring strip having one end, namely, the fixed end affixed to the mobile hard disk box and the other end, namely, the free end supported on a part inside the mobile hard disk box, and a carrier plate fixedly supported on the bridge-like spring strips and having four upright studs for securing a hard disk.

1 Claim, 5 Drawing Sheets

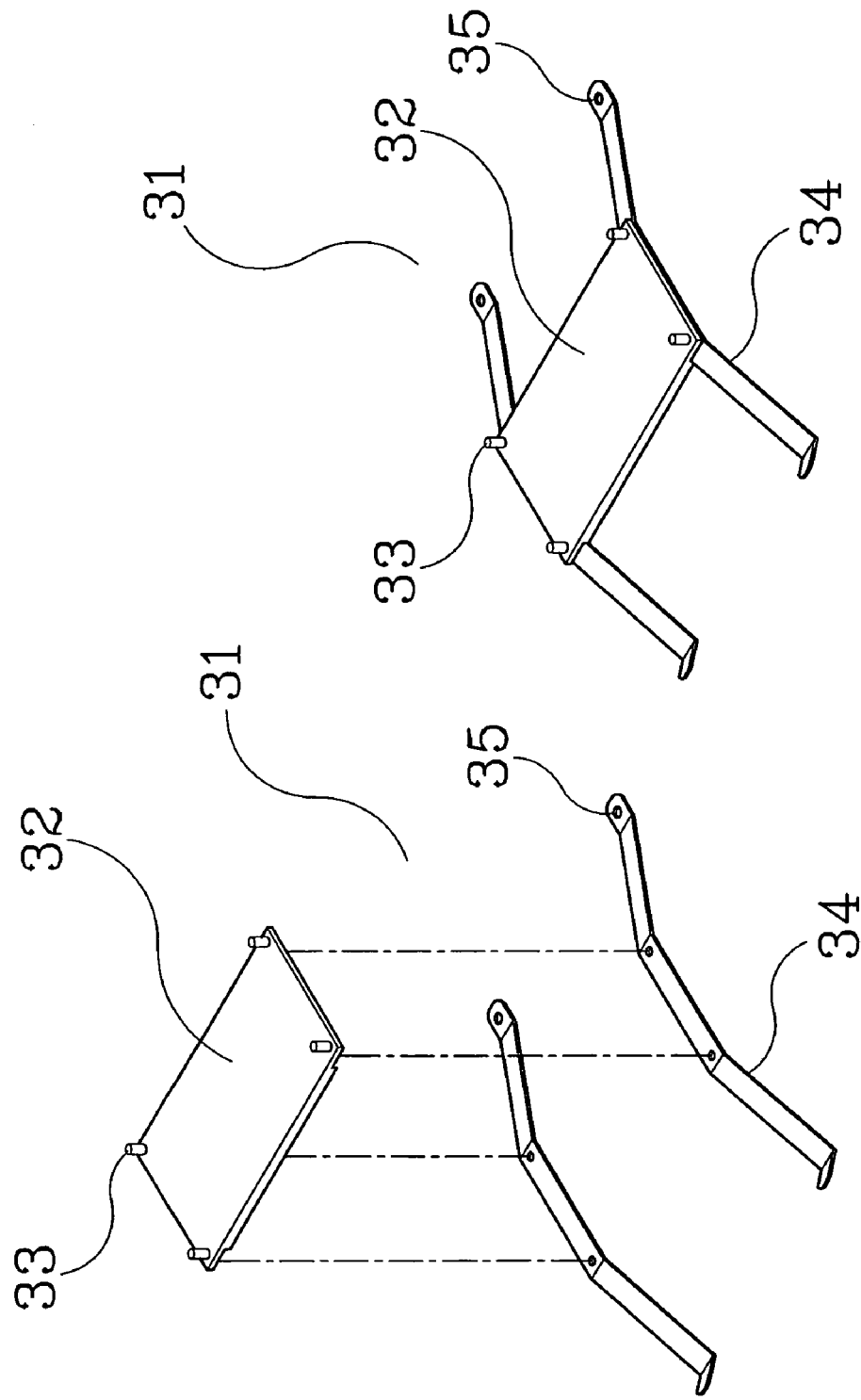

MOBILE HARD DISK MOUNTING STRUCTURE

BACKGROUND OF THE INVENTION

1. Field of the Invention

The present invention relates to a mobile hard disk mounting structure for fastening a hard disk inside a mobile hard disk box, and more particularly to such a mobile hard disk mounting structure that absorbs horizontal and vertical shocks to prevent stuck of parts of the hard disk upon a vibration.

2. Description of the Related Art

FIG. 1 shows a mobile hard disk mounting structure according to the prior art. According to this design, shock-absorbing fastening members 21 are used to fasten a hard disk 10 to a mobile hard disk box 20. According to this design, the shock-absorbing fastening members 21 are screw members each having a threaded shank 22 and a coil spring 23 mounted on the threaded shank 22. During installation, as shown in FIGS. 1 and 3, the shock-absorbing fastening members 21 are respectively inserted through respective through holes (not shown) on the bottom panel of the mobile hard disk box 20 and then threaded into a respective mounting screw hole on the hard disk 10 to secure the hard disk 10 to the inside of the mobile hard disk box 20, keeping the coil springs 23 stopped against the outside wall of the bottom panel of the mobile hard disk box 20. Upon a vertical pressure, the coil springs 23 are compressed and released to absorb shocks (see FIG. 3). However, this design cannot absorb shocks in horizontal direction. The inside parts of the hard disk 10 may be stuck when the hard disk 10 is oscillated accidentally by an external force in horizontal direction. Further, because this mobile hard disk mounting structure uses totally 4 shock-absorbing fastening members, its installation requires much time and labor.

SUMMARY OF THE INVENTION

The present invention has been accomplished under the circumstances in view. It is one object of the present invention to provide a mobile hard disk mounting structure, which supports the hard disk in balance and protects the hard disk against horizontal and vertical shocks. It is another object of the present invention to provide a mobile hard disk mounting structure, which prevents stuck parts of the hard disk upon vibration. It is still another object of the present invention to provide a mobile hard disk mounting structure, which is easy to install and saves much installation labor and time.

To achieve these and other objects of the present invention, the invention uses two bridge-like spring strips to support a carrier plate that carries a hard disk. The bridge-like spring strips each have one end, namely, the fixed end affixed to the mobile hard disk box and the other end, namely, the free end supported on a part inside the mobile hard disk box.

BRIEF DESCRIPTION OF THE DRAWINGS

FIG. 4 is an exploded view of a shock-absorbing hard disk fastening device for use in a mobile hard disk mounting structure according to the present invention.

FIG. 5 is an assembly view of the shock-absorbing hard disk fastening device shown in FIG. 4.

DETAILED DESCRIPTION OF THE PREFERRED EMBODIMENT

Figure 2:
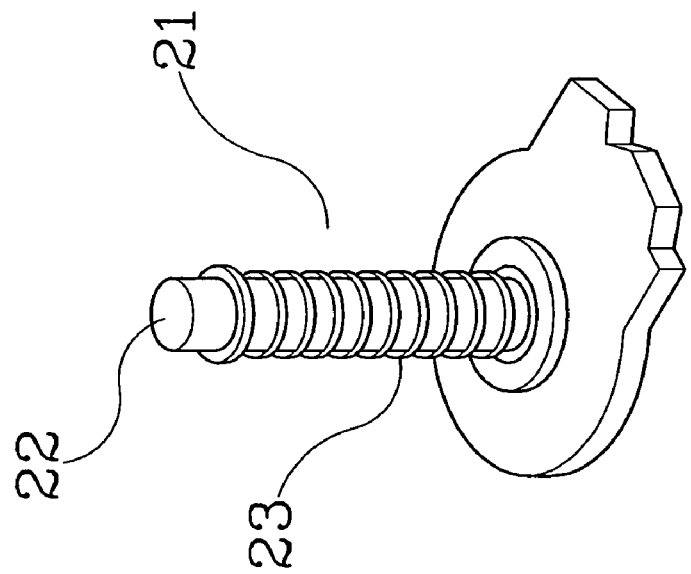
FIG. 2 is an elevational view of a shock-absorbing fastening member for mobile hard disk mounting structure according to the prior art.
Figure 1:
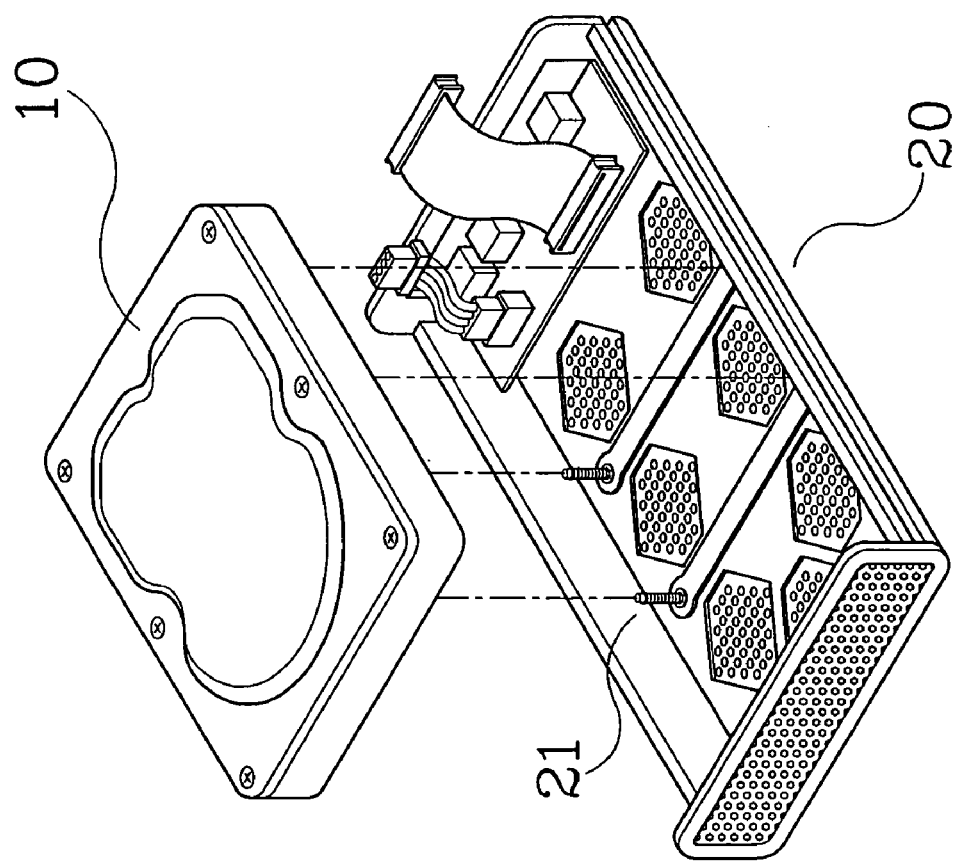
FIG. 1 is an exploded view of a mobile hard disk mounting structure according to the prior art.
Figure 3:
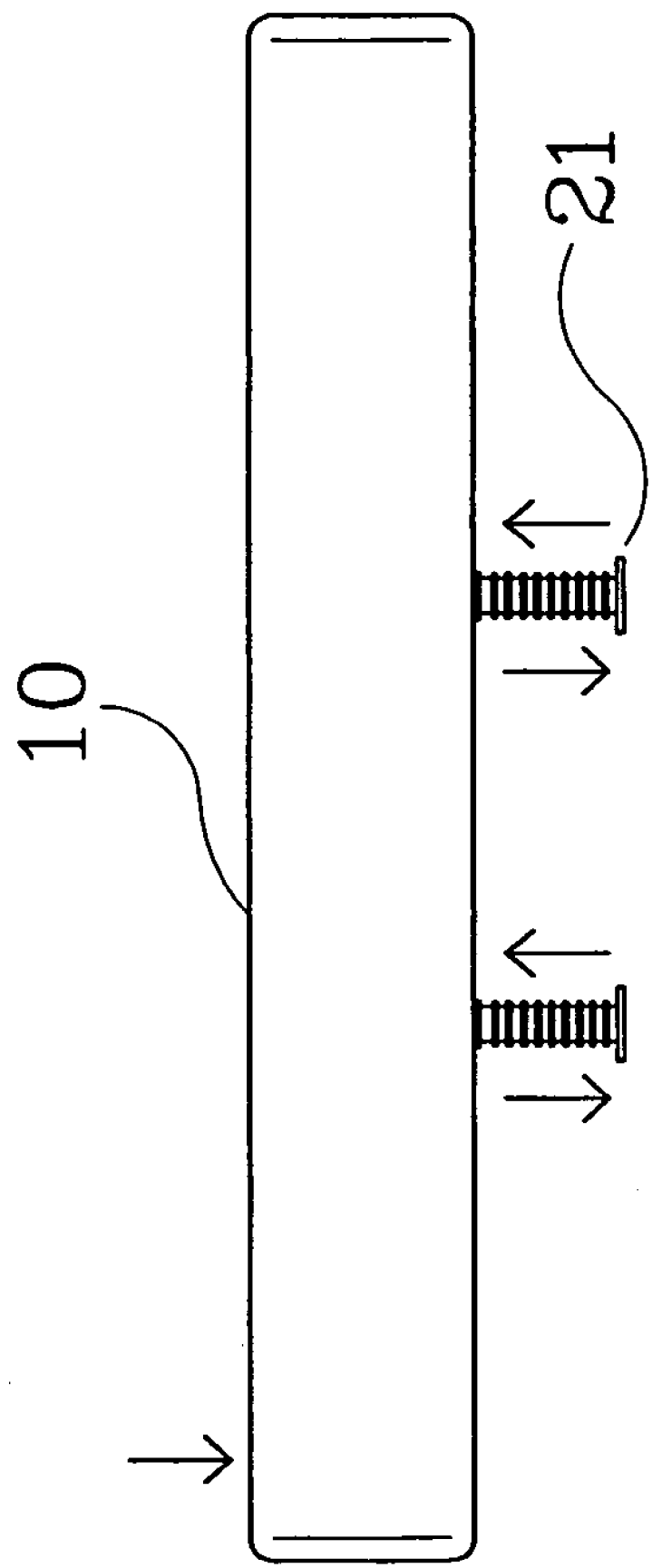
FIG. 3 is a schematic drawing showing the relationship between the hard disk and the shock-absorbing fastening members upon a pressure according to the prior art.

Referring to FIGS. 4 and 5, a shock-absorbing hard disk fastening device 31 for mobile hard disk mounting structure in accordance with the present invention is shown comprised of a carrier plate 32 and two spring strips 34. The carrier plate 32 is a flat plate having four studs 33 vertically upwardly extending from the top side near the four corners. The two spring strips 34 are springy bridge members bilaterally and fixedly fastened to the bottom side of the carrier plate 32 for supporting the carrier plate 32 on the respective horizontal middle parts thereof above a flat surface, each having a mounting through hole 35 on one end.

Figure 7:
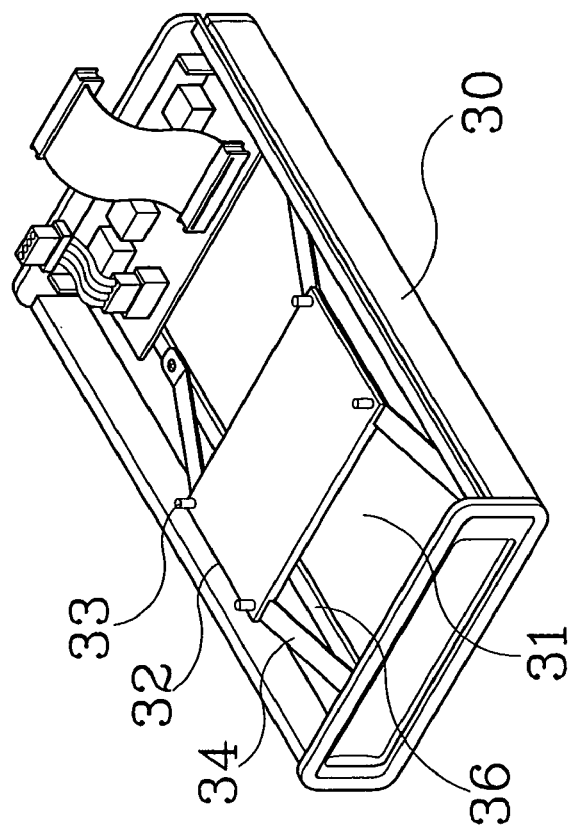
FIG. 7 is an assembly view of FIG. 6.
Figure 6:
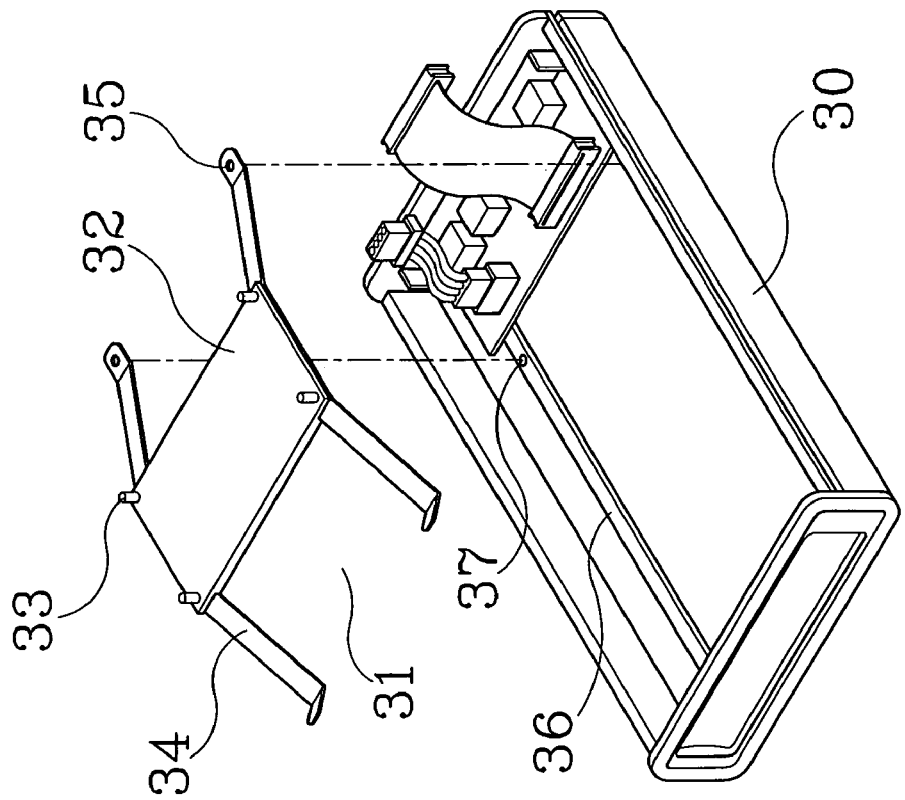
FIG. 6 shows the relationship between the shock-absorbing hard disk fastening device and a mobile hard disk box according to the present invention.

Referring to FIGS. 6 and 7, a mobile hard disk box 30 for mobile hard disk mounting structure in accordance with the present invention is shown having two rails 36 arranged in parallel on the inside, and a mounting screw hole 37 on each rail 36 for the mounting of the shock-absorbing hard disk fastening device 31. During installation, the mounting through holes 35 of the spring strips 34 are respectively affixed to the mounting screw holes 37 on the rails 36 with a respective screw, and the other ends of the spring strips 34 are respectively directly supported on the rails 36, thereby supporting the carrier plate 32 in balance above the rails 36 and allowing oscillation of the carrier plate 32 relative to the mobile hard disk box 30 to absorb shocks.

Figure 9:
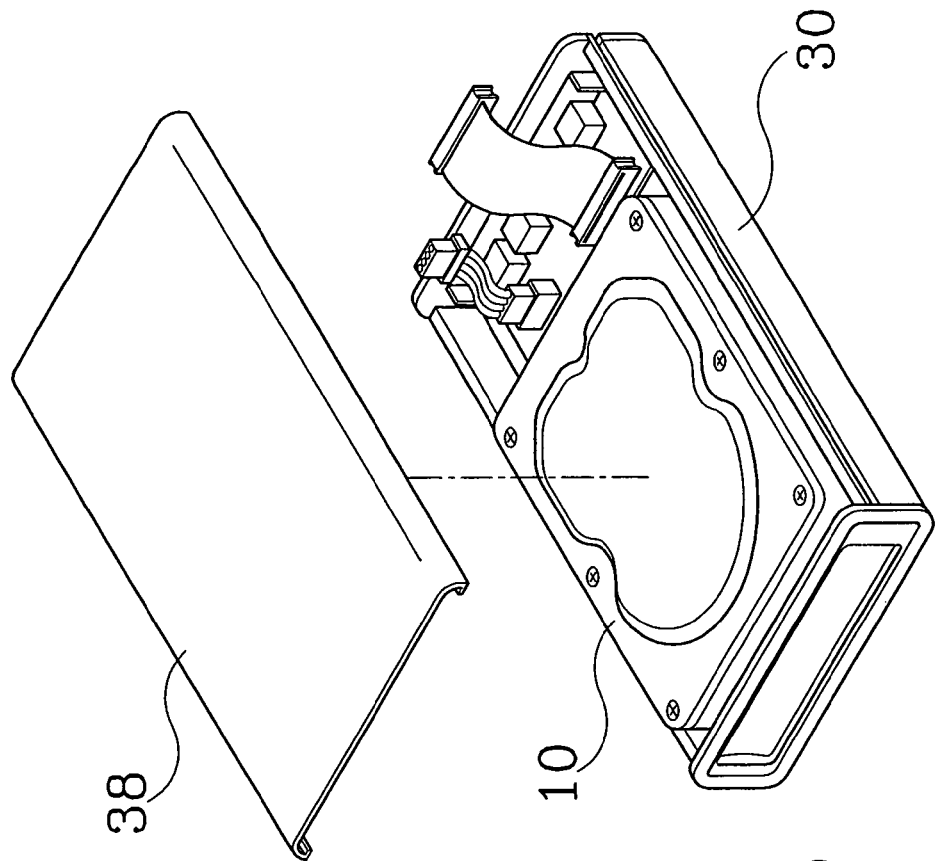
FIG. 9 is an assembly view of FIG. 8.
Figure 8:
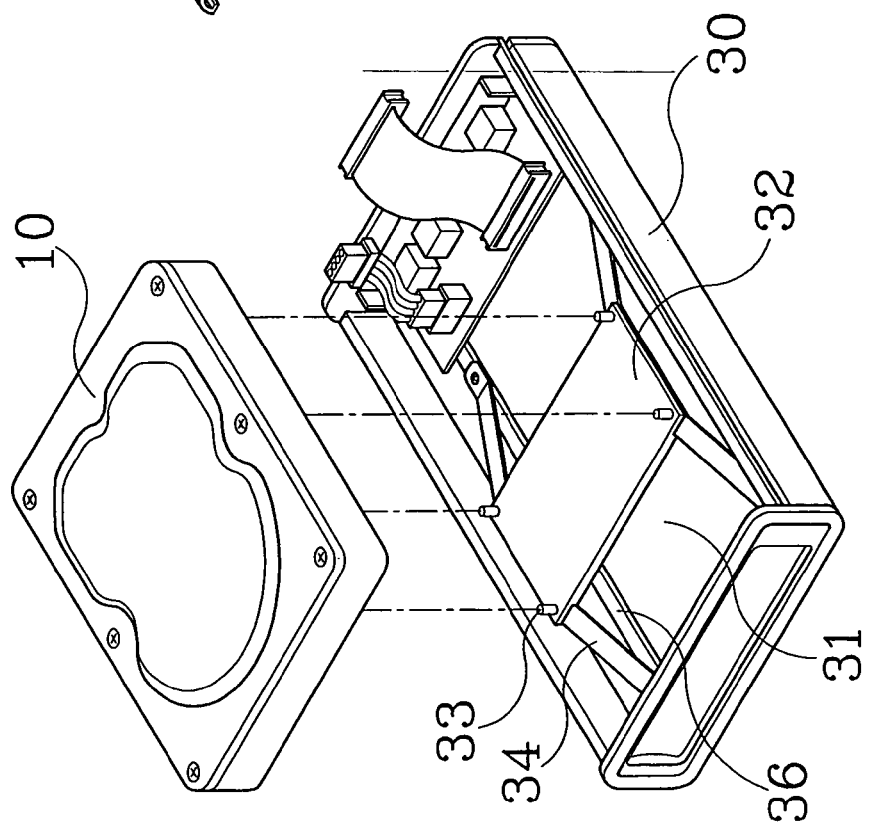
FIG. 8 corresponds to FIG. 7, showing the positioning of a hard disk on the shock-absorbing hard disk fastening device.

Referring to FIGS. 8 and 9, a hard disk 10 is fastened (with its bottom mounting holes) to the studs 33 of the carrier plate 32, and then a top cover 38 is fastened to the mobile hard disk box 30 for protection.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A mobile hard disk mounting structure comprising:
a mobile hard disk box, said mobile hard disk box having two rails arranged in parallel on the inside, said rails each having a vertical mounting screw hole; and
a shock-absorbing fastening device for supporting a hard disk inside of said mobile hard disk box, said shock-absorbing fastening device comprising two spring strips respectively fastened to said rails, said spring strips each having a horizontal middle part suspending above the associating rail, a flat first end supported on the associating rail and kept away from the mounting screw hole of the associating rail at a distance, and a second end supported on the associating rail and fixedly fastened to the mounting screw hole of the associating rail, said second end having a mounting through hole for fastening to the associating mounting screw hole with a screw, and a carrier plate fixedly fastened to the horizontal middle parts of said spring strips and suspending above said rails for carrying a hard disk, said carrier plate having four studs vertically upwardly extending from four corners of a top side thereof for the mounting of a hard disk.

* * * * *